United States Patent
Banerji et al.

(10) Patent No.: US 11,064,214 B2
(45) Date of Patent: *Jul. 13, 2021

(54) SYSTEM AND METHODOLOGY FOR VIDEO COMPRESSION

(71) Applicant: The DIRECTV Group, Inc., El Segundo, CA (US)

(72) Inventors: Ashish Banerji, Gaithersburg, MD (US); Kumar Swaminathan, North Potomac, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/860,506

(22) Filed: Apr. 28, 2020

(65) Prior Publication Data

US 2020/0260103 A1 Aug. 13, 2020

Related U.S. Application Data

(63) Continuation of application No. 15/866,626, filed on Jan. 10, 2018, now Pat. No. 10,674,176, which is a continuation of application No. 10/174,765, filed on Feb. 12, 2002, now Pat. No. 9,894,379.

(60) Provisional application No. 60/304,135, filed on Jul. 10, 2001.

(51) Int. Cl.
*H04N 19/517* (2014.01)
*H04N 19/61* (2014.01)
*H04N 19/46* (2014.01)

(52) U.S. Cl.
CPC ........... *H04N 19/517* (2014.11); *H04N 19/46* (2014.11); *H04N 19/61* (2014.11)

(58) Field of Classification Search
CPC ....... H04N 19/517; H04N 19/61; H04N 19/46
USPC .................................................. 375/240.12
See application file for complete search history.

(56) References Cited

U.S. PATENT DOCUMENTS

| | | | |
|---|---|---|---|
| 5,278,647 A * | 1/1994 | Hingorani | H04N 19/132 375/240.15 |
| 5,289,276 A | 2/1994 | Siracusa et al. | |
| 5,414,469 A | 5/1995 | Gonzales et al. | |
| 5,668,599 A * | 9/1997 | Cheney | H04N 19/427 375/240.15 |
| 5,710,719 A * | 1/1998 | Houle | G06T 9/40 341/60 |
| 5,867,221 A | 2/1999 | Pullen et al. | |
| 5,990,812 A * | 11/1999 | Bakhmutsky | H03M 7/425 341/106 |
| 6,072,834 A | 6/2000 | Kim et al. | |
| 6,141,447 A | 10/2000 | Linzer et al. | |
| 6,201,834 B1 | 3/2001 | Zhu | |
| 6,246,347 B1 * | 6/2001 | Bakhmutsky | H04N 19/00 341/50 |
| 6,501,397 B1 | 12/2002 | Radha et al. | |
| 6,810,082 B1 | 10/2004 | Shen et al. | |

(Continued)

*Primary Examiner* — Tung T Vo
(74) *Attorney, Agent, or Firm* — Guntin & Gust, PLC; Ralph Trementozzi

(57) ABSTRACT

A system and method for compressing video is disclosed, in which video frames that are only between consecutive I-frames are grouped into a video data set. The video data set is split into separate homogeneous files, and each of the homogeneous files are individually compressed. In one embodiment, the individually compressed files are multiplexed to form a bit stream.

20 Claims, 6 Drawing Sheets

(56) References Cited

U.S. PATENT DOCUMENTS

| | | | |
|---|---|---|---|
| 6,988,238 B1 * | 1/2006 | Kovacevic | H04N 21/4425 714/799 |
| 7,236,526 B1 | 6/2007 | Kitamura | |
| 2018/0160139 A1 | 6/2018 | Banerji et al. | |

* cited by examiner

SYSTEM AND METHODOLOGY FOR VIDEO COMPRESSION

CROSS-REFERENCE TO RELATED APPLICATIONS

This application is a continuation of and claims priority to U.S. patent application Ser. No. 15/866,626, filed Jan. 10, 2018, which is a continuation of and claims the benefit of U.S. patent application Ser. No. 10/074,765, filed Feb. 12, 2002 (now U.S. Pat. No. 9,894,379), which claims the benefit of U.S. Provisional Application No. 60/304,135, filed Jul. 10, 2001, each of which are incorporated by reference herein in their entirety.

FIELD OF THE DISCLOSURE

The present invention relates to video compression and more particularly to improving compression efficiency in motion-compensated transform-based encoders of video.

BACKGROUND OF THE DISCLOSURE

The most formidable challenge to the acceptance of digital video technology lies in the large data size of video content. For example, a two-hour motion picture may use high resolution frames of 4000 pixels by 3000 pixels, for a total of 12,000,000 pixels per frame. For high picture quality, each pixel may comprise 10 bits of data in each of three-color spaces, e.g. Red-Green-Blue (RGB), and, for improved color quality, there are plans to allocate even more bits per pixel. At 24 frames per second, the entire two-hour movie would require over 8 terabytes (8 trillion bytes), which is a substantial amount of storage. Accordingly, there has been much interest in compression techniques for video content.

Compression of video data typically exploits two types of redundancies: spatial and temporal. Reduction of spatial redundancy is achieved using transform coding, such as the discrete cosine transform (DCT), which works by decorrelating the input samples in every 8.times.8 block of each frame of video sequence. The coefficients are then zigzag scanned, quantized, and entropy encoded. Reduction of temporal redundancy, on the other hand, is achieved using motion-compensated predictive coding, in which the encoder estimates the motion between two frames by matching each block of the current frame with the previous frame. The residual frame after this matching step is then coded using DCT, and the motion vectors are coded as additional information. Major video coding standards such as MPEG-1, MPEG-2, MPEG-4, H.261, H.263 and H.263+ employ such a motion-compensated transform-based coding approach.

Frames that are coded without any reference to previously coded frames are referred to as "Intra frames" (or I-frames). I-frames exploit spatial redundancy only using a transform coding such as DCT. Frames that are coded using a previously coded frame are called "Inter" or "non-Intra" frames. Inter frames themselves can be of two types: (i) Predictive frames (P-frames), coded with respect to the immediately previous I-frame or P-frame; and (ii) Bidirectionally predictive frames (B-frames), coded with respect to the immediately previous I-frame or P-frame as well as the immediately next P-frame or I-frame. In a typical video coding scenario, I-frames are spaced a certain number of frames apart, with several P-frames and B-frames between two consecutive I-frames. The spacing between consecutive I-frames is referred to as the "I-frame distance." The main purposes of introducing periodic I-frames is to allow easy editing on the compressed video bit-stream and resynchronization of a transmitted compressed video bit-stream in case one of the non-intra frames are accidentally dropped.

In a motion-compensated transform-based coder, motion vectors are first estimated (except in the case of an I-frame) and the estimated motion vectors and motion compensation modes are entropy-encoded using variable length coding. The motion-compensated residual frame (original frame in the case of an I-frame) then undergoes an 8.times.8 block-DCT transformation. The 8.times.8 block of DCT coefficients then undergo quantization, zigzag scanning, and a run-length followed by entropy encoding using variable length coding. Together, motion vectors, including motion compensation modes, and quantized DCT coefficients are used to reconstruct a lossy version of the original video sequence.

The variable-length coding for both motion vectors (and motion compensation modes) and quantized DCT coefficients is done using look-up tables akin to Huffman coding on a frame-by-frame basis. Separate variable code length look-up tables are provided under a few different conditions, for example, separate VLC tables are provided for intra-coded blocks and for inter-coded blocks in the case of quantized DCT coefficients. However, the number of different variable length coding tables is small, and moreover, since they are optimized over a large class of test video sequences, they are not necessarily close to optimal for specific video sequences.

SUMMARY OF THE INVENTION

One aspect of the present invention relates to a system and method for compressing video, in which video frames that between consecutive I-frames are grouped into a video data set. The video data set is split into separate homogeneous files, and each of the homogeneous files are individually compressed. In one embodiment, the individually compressed files are multiplexed to form a bit stream.

This aspect stems from the realization that previous implementations of motion-compensated transform-based coding compress the motion vectors and the quantized DCT coefficients independently for each frame, without exploiting the knowledge of data history. For example, motion vectors and modes often bear close resemblance across frames for similar regions of a video sequence. The same is true regarding DCT coefficients. Accordingly, this aspect of the present invention exploits the repetitiveness of motion vectors and quantized DCT coefficients across frames by collecting those non-intra frames between two consecutive I-frames into sets, referred to herein as "I-frame distance sets."

Furthermore, the motion data information of each I-frame distance set is split into a set of homogenous files, based on whether the component represents horizontal or vertical motion, whether the frame is P- or B-type, and so on. For example, horizontal motion components for P frames are stored in one file, while vertical motion components for P frames are stored in another file. An additional file is formed that stores the motion compensation modes. These files are then individually compressed using a suitable lossless data compression algorithm that can exploit data history from the beginning of each file. Because the files are homogeneous, the statistical properties of all the data in each separate file are similar and the motion data can therefore be compressed to a much greater extent than if the motion data were not separated.

In one embodiment, the quantized transform coefficient data, on the other hand, are first represented in a bit-plane fashion. The quantized transform coefficient data are split into a set of files corresponding to different bit-planes of the quantized transform coefficient data, and an additional file is formed that provides information about the number of bit-planes for each block in a frame. These bit-plane files are further compressed using run-length encoding. The run-length encoded files and the additional file are then individually coded using a suitable lossless data compression algorithm that can exploit data history from the beginning of each file.

Still other aspects, features, and advantages of the present invention are readily apparent from the following detailed description, simply by illustrating several embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE DRAWINGS

A system, method, and software for video compression are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

In the following description, for the purposes of explanation, numerous specific details are set forth with respect to an MPEG-4 based video encoder. An MPEG-4 based video encoder has one or more layers (base and enhancement layers), where each layer is associated with its own set of motion vector (including motion compensation mode) and quantized DCT coefficient data. The following description illustrates the details of the present invention for one such layer. The reference to MPEG-4 is meant only to provide a thorough understanding of the present invention; however, the present invention is not limited to an MPEG-4 based video encoder and may be advantageously used with any motion-compensated transform-based coding of video.

Functional Overview

Figure 1:
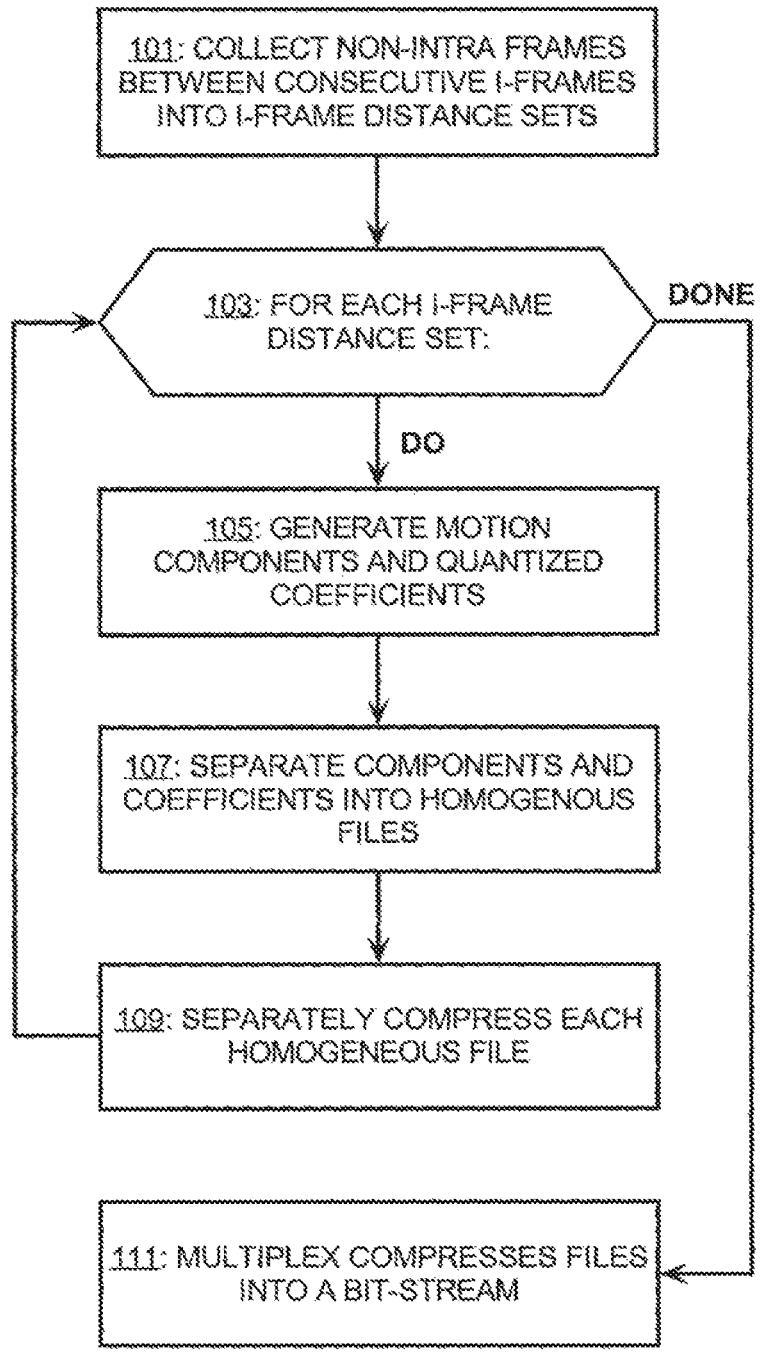
FIG. 1 is a high-level flow chart illustrating the operation of one embodiment of the present invention.

In the Referring to FIG. 1, depicted is a high-level flow chart illustrating the operation of one embodiment of the present invention. At step 101, the non-intra frames that are between consecutive I-frames are collected into video data sets referred to herein as "I-frame distance sets." Each I-frame distance set is then processed and compressed in a loop (steps 103, 105, 107, and 109) and the results are then multiplexed into a bit stream (step 111). Specifically, step 103 controls a loop over each of the I-frame distance sets, in which motion components and quantized coefficients are generated (step 105), separated into components (step 107), and separately compressed (step 109).

Figure 2:
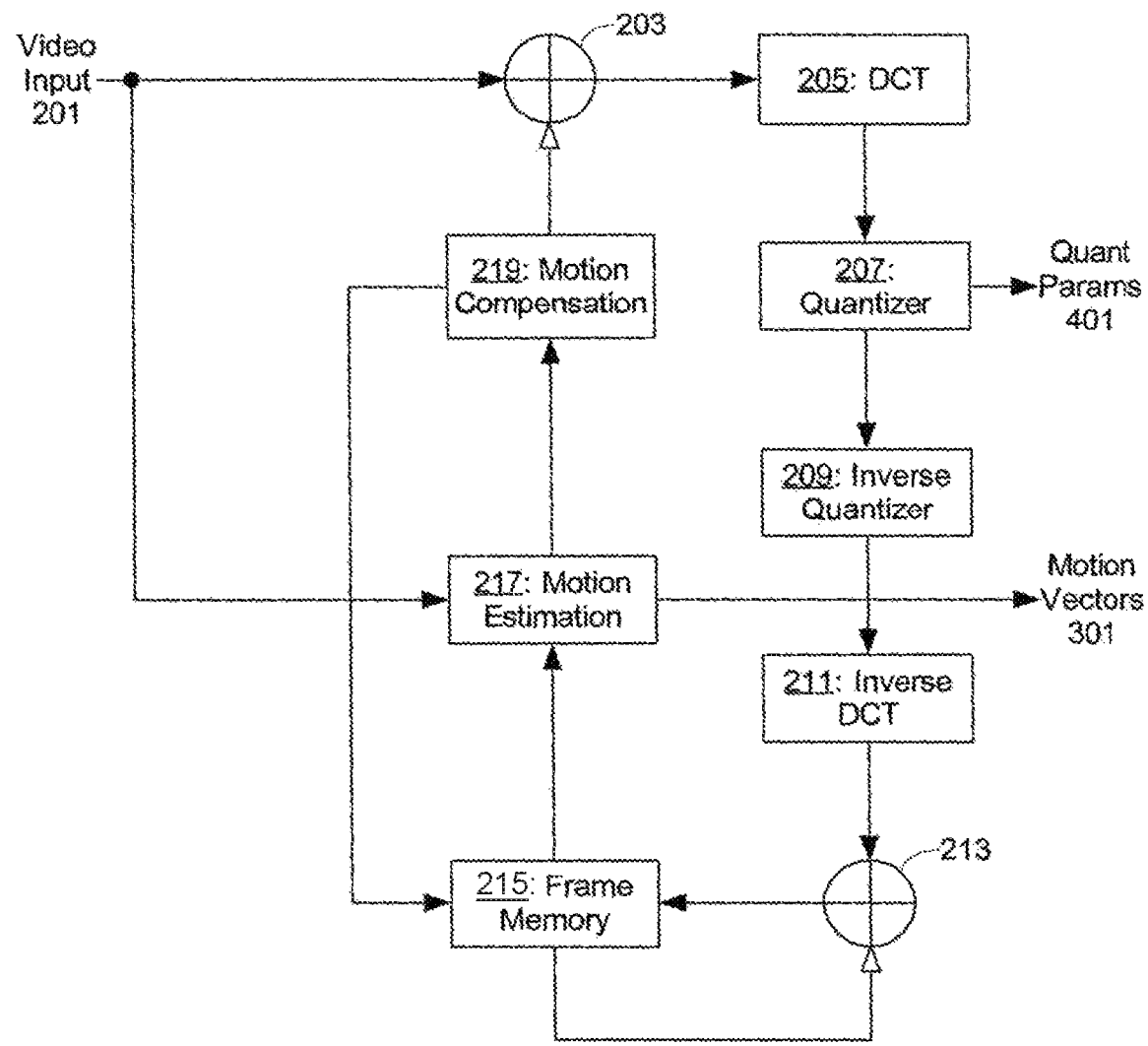
FIG. 2 is a flow diagram illustrating the analysis of video information into motion components and quantized discrete cosine transform (QDCT) coefficients in accordance with one embodiment of the present invention.

At step 105, the video data in each I-frame distance set is analyzed to generate motion components and quantized coefficients. FIG. 2 is a flow diagram illustrating the analysis of video information into motion components and quantized discrete cosine transform (QDCT) coefficients in accordance with one embodiment of the present invention. The video processing begins with the input video data 201 already transformed into the appropriate color space, such as YUV which has been decorrelated to reduce the inter-color-axis correlation intrinsic to RGB. The video data 201 are then modified (203) to account for motion compensation 221 from the previous frame and are then applied to a discrete cosine transform (DCT) coder (205), as performed, for example, in MPEG4. The DCT coefficients output from the DCT coder 205 are quantized by quantizer 207 to produce quantized transform coefficients 401.

The quantized transform coefficients 401 are then used to reconstruct the video frame, by passing through an inverse quantizer 209 and an inverse DCT 211. The reconstructed video frame is then added (213) to a buffered frame 215 that is saved for motion compensation purposes. Specifically, the buffered frame 215 is passed to a motion estimation block 217, in which the inter-frame movements (with respect to the adjacent temporal base layer frames, or with respect to adjacent temporal enhancement layer frames) are predicted and stored in a motion data set 301. The motion vectors are also applied to the motion compensator 219 which predicts the next frame based on the current motion vectors. The predicted frame is applied against the next frame of the input video data 201 at adder 203.

The motion estimation procedure 219 provides motion vector components in quarter pixel units, and the motion vector components are available as signed integers in the range of −2048 and +2047. However, most components tend to have small absolute values. Accordingly, in one embodiment of the present invention, these integers are first pre-processed in order to represent them in a way that allows easy application of lossless data compression algorithm. In one such implementation, a signed integer say m, is mapped into a non-negative integer, t(m), according to a reversible rule: If m.gtoreq.0, then t(m)=2*m, else t(m)=−2*m−1. The odd bytes in resulting files tend to show a great deal of sparseness, which can be compressed very much, because most or all odd bytes are typically zeroes.

Compression of Motion Data

Figure 3:
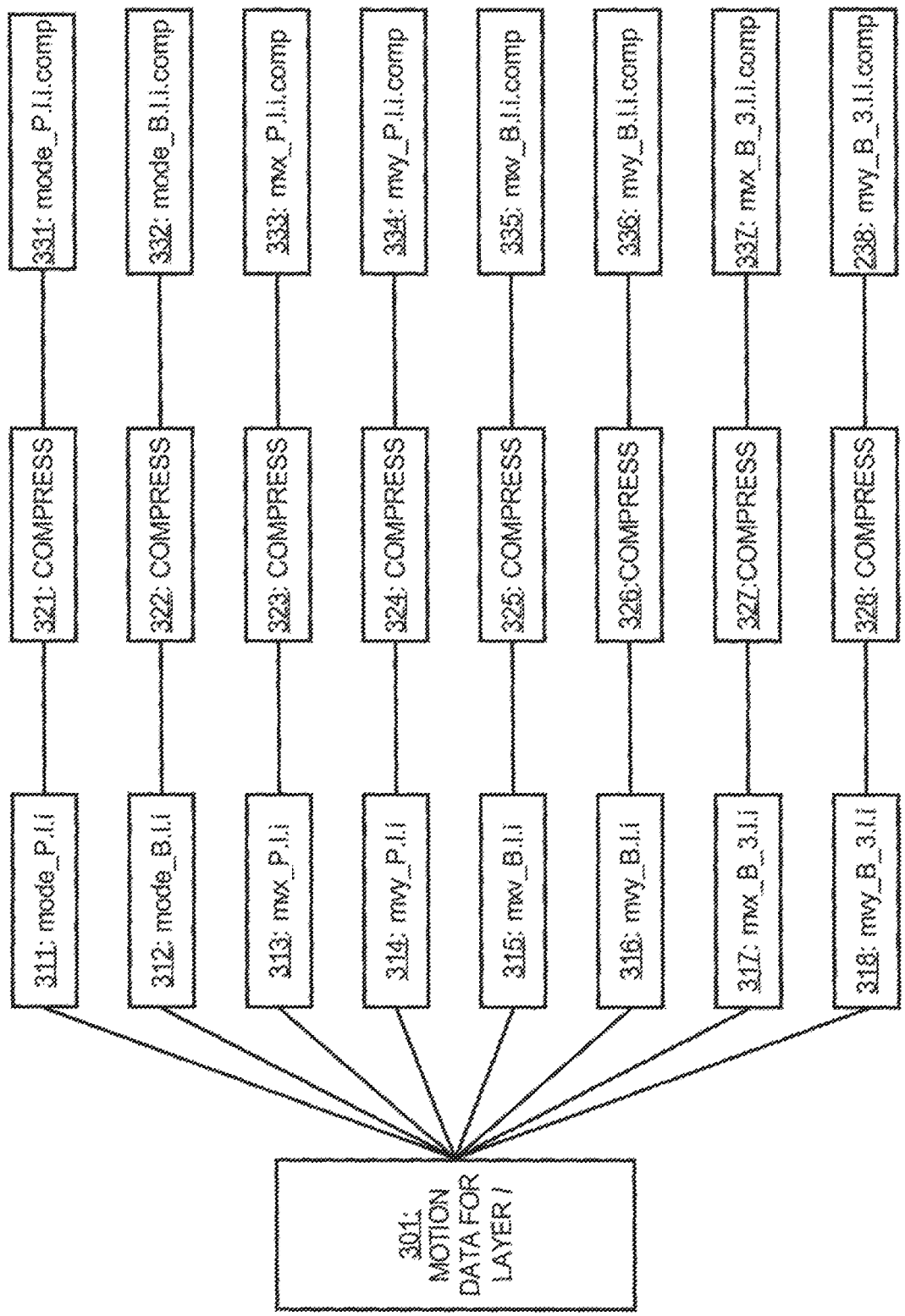
FIG. 3 is a flow diagram showing compression of motion components in accordance with one embodiment of the present invention.

FIG. 3 shows the separation (FIG. 1, step 107) and compression (FIG. 1, step 109) of the motion data. More specifically, each layer "l" of the motion components data 301 of an I-frame distance set is split into several homogeneous files 311, 312, 313, 314, 315, 316, 317, and 318. The motion components data 301 of an I-frame distance set includes motion compensation modes and motion vectors of non-intra frames between two consecutive I-frames. In the following filenames, "i" stands for the index of the intra-frame distance in the overall video sequence, and "l" stands for the layer. Advantageously, splitting serves to combine data components of similar nature, making the resulting files homogenous, in that the data components have similar statistical properties. Because data values tend to have similar statistical properties within such a file, a lossless compression algorithm can subsequently exploit the similarities for excellent compression performance.

The mode_P.l.i file 311 stores an integer (0, 1, or 4) corresponding to the motion compensation mode used in each macroblock in a P-type frame. Mode 0 stands for intra, 1 stands for 16.times.16 motion vector, and 4 stands for four motion vectors for each 8.times.8 block in each macroblock.

The mode_B.l.i file 312 holds an integer (0, 1, 2, or 3) corresponding to the motion compensation mode used in each macroblock in a B-type frame. Mode 0 stands for a forward motion vector, 1 stands for a backward motion vector, 2 stands for a bidirectional motion vector, and 3 stands for direct mode motion compensation.

The mvx_P.l.i file 313 stores the horizontal components of the motion vectors for the P-type frames. Preferably, these are differential motion values, obtained after intra-frame prediction. Intra-frame prediction exploits the two-dimensional redundancy in a causal neighborhood of the current macroblock. Most lossless data compression algorithms are one-dimensional and cannot exploit this. The mvy_P.l.i file 314 stores the vertical components of the motion vectors for the P-type frames. Like the mvx_P.l.i file 313, the mvy_P.l.i file 314 also preferably comprises differential values after intra-frame prediction.

The mvx_B.l.i file 315 stores the horizontal components of the motion vectors corresponding to modes 0, 1, and 2 for the B-type frames. The mvy_B.l.i file 316 stores the vertical components of the motion vectors corresponding to modes 0, 1, and 2 for the B-type frames. Both these files are preferably formed of differential data after intra-frame prediction.

The mvx_B.sub.—3.l.i file 317 stores the horizontal components of the motion vectors corresponding to mode 3 (direct mode) for the B-type frames. The mvy_B.sub.—3.l.i file 318 stores the vertical components of the motion vectors corresponding to modes 3 for the B-type frames. The mvx_B.sub.—3.l.i file 317 and the mvy_B.sub.—3.l.i file 318 are preferably formed separately from the mvx_B.l.i file 315 and the mvy_B.l.i file 316 because the differential motion vectors for direct mode show distinctly different statistical properties than the non-differential motion vectors for the other three modes.

Each set of these files 311, 312, 313, 314, 315, 316, 317, and 318 comprises the motion data for the frames in an intra frame distance, and each of these files are subsequently compressed using a respective lossless compression step 321, 322, 323, 324, 325, 326, 327, and 328 to yield the following eight files: mode_P.l.i.comp 331, mode_B.l.i.comp 332, mvx_P.l.i.comp 333, mvy_P.l.i.comp 334, mvx_B.l.i.comp 335, mvy_B.l.i.comp 336, mvx_B.sub.—3.l.i.comp 337, and mvy_B.sub.—3.l.i.comp 338.

In one embodiment of the present invention, a grammar-based lossless data compressing algorithm such as the "YK" algorithm is employed to implement the lossless compression step 321, 322, 323, 324, 325, 326, 327, and 328, although other embodiments may implement the lossless compression step with other kinds of encoding, e.g. those employing a Lempel-Ziv type algorithm or a Burrows-Wheeler transform. The YK algorithm derives its name from the fact has been proposed by Dr. En-hui Yang of Waterloo University and Dr. John C. Kieffer of the University of Minnesota. A grammar-based code has two steps: first a grammar transform and then an arithmetic coding of the grammar. These two different approaches complement each other well. The grammar transform, which uses string matching-based operations, handles the repetitive redundancy in the original data, and the subsequent arithmetic coding handles the statistical redundancy. Grammar-based codes have been shown to asymptotically achieve the entropy rate of a stationary, ergodic source.

In the framework of the YK grammar-based code, the original data is first transformed into an irreducible context-free grammar. A grammar is defined by a source alphabet, a set of variables, and a set of production rules that map each variable into a finite string of zero or more symbols in the source alphabet or variables. The irreducible context free grammar can be constructed by applying a greedy algorithm, which parses the incoming source string to find the longest prefix that corresponds to a grammar variable that has already been generated. This variable is appended to the highest-level production rule, augmenting the grammar. While the augmented grammar is admissible, the augmented grammar might not be irreducible, so reduction rules are applied to augmented grammar to reduce the grammar to an irreducible grammar. It can be shown that a maximum of two application of reduction rules are needed. The transformation of the original data into an irreducible context-free grammar can be implemented in linear time.

Each irreducible grammar gives rise to a non-overlapping, variable-length parsing of the original data. Thus, after the grammar has been produced, an arithmetic coding technique is applied to the context free grammar for compression. Unlike the Lempel-Ziv parsing, however, an unrestricted number of repetitions of a parsed phrase are permitted, enabling the grammar-based code to benefit from the arithmetic coding step. (Because the number of repetitions of a parsed phrase is limited in a Lempel-Ziv encoding, the arithmetic coding step need not be used for Lempel-Ziv.) Yang has proposed three arithmetic coding options to compress the grammar: a hierarchical algorithm, a sequential algorithm, and an improved sequential algorithm. In empirical tests of lossless video archiving, it has been found that the improved sequential algorithm provides the best compression of the three techniques. It is this improved sequential algorithm that is referred to as the "YK algorithm".

During the operation of one implementation of a grammar-based code, three basic operations are repeatedly performed to encode the original data: parsing, updating, and arithmetic encoding. The parsing operation searches for the longest prefix of the remaining part of the original data sequence that is represented by one of the existing variables in the current grammar. The arithmetic encoding operation encodes the parsed phrase using frequency counts over an appropriately chosen alphabet. The updating operation subsequently updates the grammar after adding the parsed substring and modifies the frequency distribution on the source alphabet and set of variables.

To decode, an arithmetic decoding operation is sequentially applied to determine the parsed substring, followed by an updating operation to produce an identical sequence of grammars as in the encoder, from which the original data set is recovered incrementally. The decoding is simpler than the encoding because the parsing operation is not present in the decoder.

There are several features of the YK algorithm that make it especially suitable beyond normal expectations for video compression. The YK algorithm is sequential and, hence, does not require the whole data sequence to be present before commencing compression, thereby avoiding latency. Our experimental results show that the YK algorithm significantly outperforms other kinds of lossless data compression algorithms such as Lempel-Ziv types of codes. The YK algorithm is effective on a wide, virtually unlimited, range of data sizes, including small files such as Internet datagrams, as well as large files such as in archiving applications, in marked contrast to non-sequential lossless data compression algorithms such as those based on the Burrows-Wheeler transform, whose effectiveness only kicks at very large data sizes. The implementation complexity of the YK algorithm can be made close to that of the Lempel-Ziv type algorithm. Error-handling features can be easily incorporated into the YK decoder so that errors in the compressed bit stream can be neatly handled.

In a nutshell, the high compression efficiency of the YK algorithm is achieved through an optimally combined framework of string matching (via the grammar data structure) and statistical encoding (via the arithmetic coding) capabilities. By contrast, Lempel-Ziv type algorithms only capture string-matching redundancy, while pure arithmetic algorithms such as Huffman coding only capture statistical redundancy.

Experimental results indicate that the use of grammar-based coding results in significantly better compression ratios than other compression algorithms such as those of the Lempel-Ziv type or of the Burrows-Wheeler type. For example, on one test file, the grammar-based coding resulted in a compression ratio of 4.18 while BZIP2 and GZIP resulted in compression ratios of 3.32 and 2.43, respectively.

Compression of Transform Coefficients

Referring to FIG. 2, the quantized transform coefficients 401 (preferably after DCAC prediction for intra-coded blocks, as used, e.g., in MPEG4) are first transformed to make them all non-negative. In one embodiment, the following mapping is used: If q.gtoreq.0, the mapped value is 2.times.q, else the mapped value is −2.times.q-1. The non-negative mapped quantized transform coefficients for each 8.times.8 block are then ordered in zigzag fashion (e.g. the default scanning order as in MPEG-4). The maximum number of bits required to represent the values in each block is recorded in the file qdct_bp.l.r.i 421 (where "r" stands for one of the color components Y, Cb, or Cr). The zigzag ordered data in each block then undergoes a bitplane transformation 411. For each non-zero bitplane of each block, starting from the most significant bitplane, a run-length coding is performed by forming (RUN, EOP) symbols. The first component "RUN" denotes the number of consecutive 0's before a 1, and the second component "EOP" is 1 if there are no more 1's in the current bitplane, otherwise "eop" is 0. For the purpose of subsequent lossless compression of the (RUN, EOP) symbols, these 2-D symbols are represented by integers, as follows: If EOP=0, then the integer value is set to run; if EOP=1, the integer value is set to RUN+64. If a bitplane has all zeros, then the integer 63 is used to represent the bitplane. The (RUN, EOP) symbols for the top three bitplanes are stored in the qdct_rl.sub.—0.l.r.i file 422, the qdct_rl.sub.—1.l.r.i file 423, and the qdct_rl.sub.—2.l.r.i file 424, respectively. The (RUN, EOP) symbols for the remaining bitplanes are stored in the qdct_rl.sub.—3.l.r.i 425.

The five files 421, 422, 423, 424, and 425 are then compressed by respective lossless compression steps 431, 432, 433, 434, and 435, preferably using the YK algorithm. These steps result respectively in the following five compressed files for each I-frame distance of a video sequence: the qdct_bp.l.r.i.comp file 441, the qdct_rl.sub.—0.l.r.i.comp file 442, the qdct_rl.sub.—1.l.r.i.comp file 443, the qdct_rl.sub.—2.l.r.i.comp file 444, the qdct_rl.sub.—3.l.r.i.comp file 445.

Bit Stream Multiplexing

Figure 4:
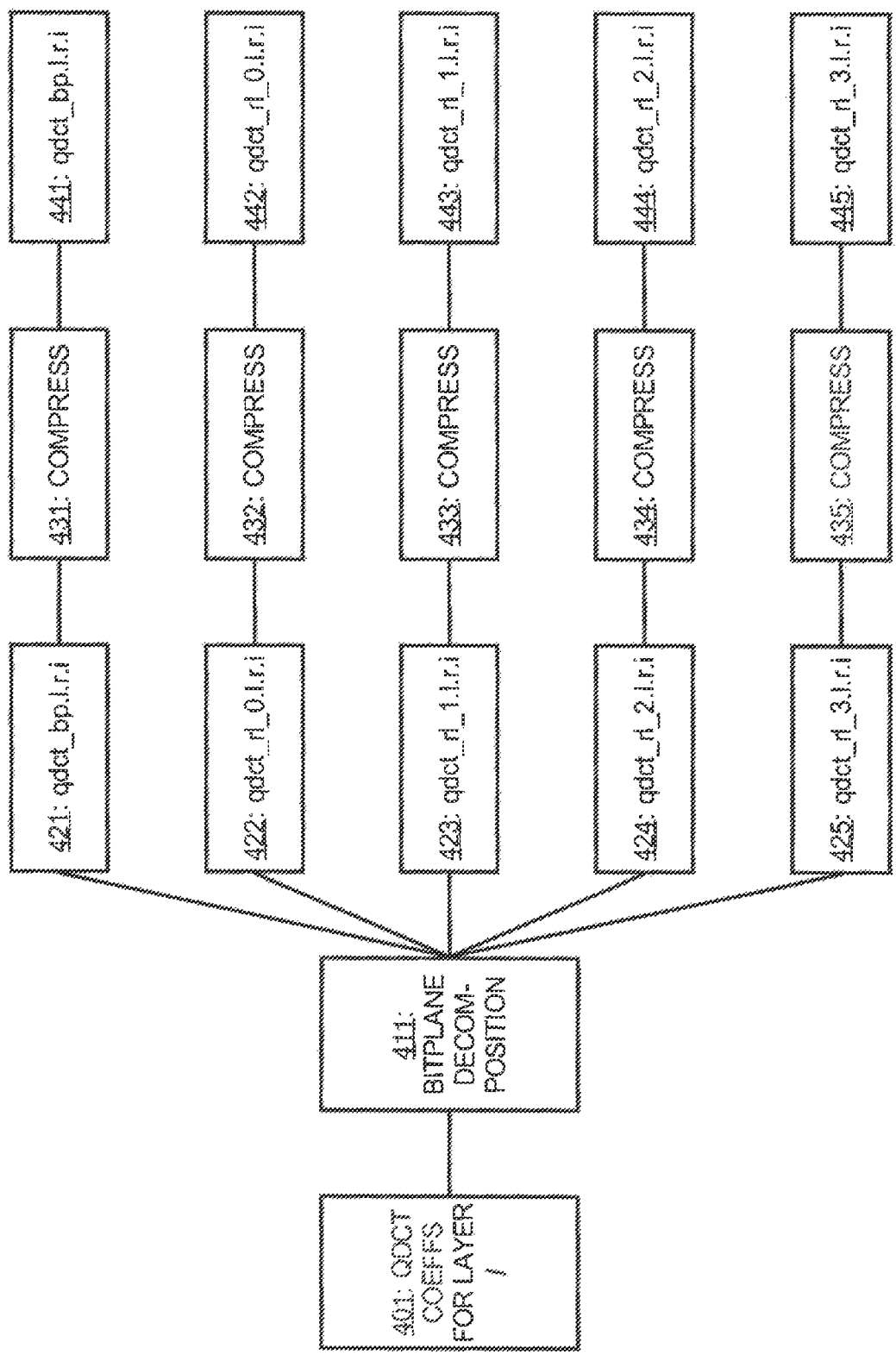
FIG. 4 is a flow diagram showing compression of QDCT coefficients in accordance with one embodiment of the present invention.
Figure 5:
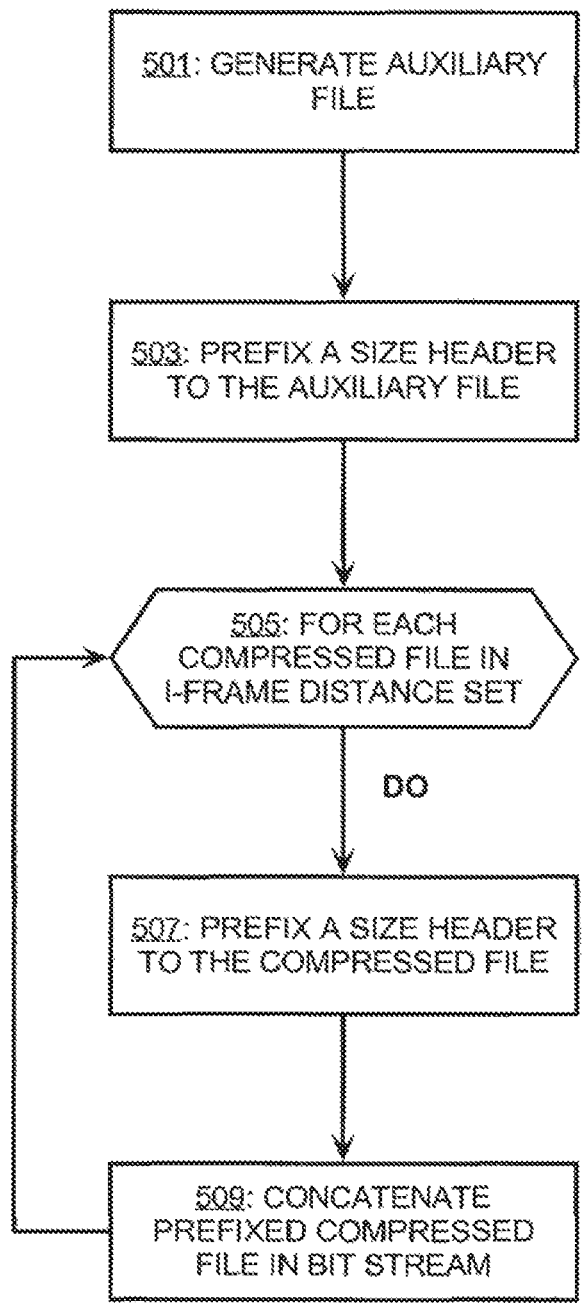
FIG. 5 illustrates the multiplexing of compressed video components into a bit stream in accordance with one embodiment of the present invention.

Referring to step 111 of FIG. 1, the compressed files are multiplexed to form a bit stream, which can be stored or transmitted. FIG. 5 illustrates one implementation for multiplexing the compressed files to form the bit stream. In one embodiment, there are thirteen such compressed files for each I-frame distance set: eight files of compressed motion data shown in FIG. 3 and five files of compressed transform coefficients shown in FIG. 4. More specifically, these files include the mode_P.l.i.comp file 331, the mode_B.l.i.comp file 332, the mvx_P.l.i.comp file 333, the mvy_P.l.i.comp file 334, the mvx_B.l.i.comp file 335, the mvy_B.l.i.comp file 336, the mvx_B.sub.—3.l.i.comp file 337, the mvy_B.sub.—3.l.i.comp file 338, the qdct_bp.l.r.i.comp file 441, the qdct_rl.sub.—0.l.r.i.comp file 442, the qdct_rl.sub.—1.l.r.i.c-omp file 443, the qdct_rl.sub.—2.l.r.i.comp file 444, and the qdct_rl.sub.—3.l.r.i.comp file 445.

In addition, at step 501, an auxiliary file is generated, which contains auxiliary information that is useful or needed to correctly interpret the rest of the files in the bit stream. Examples of information stored in the auxiliary file include frame width, frame height, quantization parameters, and the size (in bytes) of the size header. The size header is a value that is prefixed to each of the files in the bit stream to identify the size of the corresponding file. For example, the size of the auxiliary file is computed and prefixed to the auxiliary file in step 503. The size header size is chosen to represent the sizes of each of the constituent files of the bit stream. For example, if all the file sizes are guaranteed to bounded above by 4.times.10.sup.9 bytes, a size header of four bytes is enough. Employing four-byte size headers yields a total of insignificant 56 bytes overhead for multiplexing all the 14 files from each layer for an I-frame distance duration of the video sequence.

Step 505 controls a loop for multiplexing the remaining thirteen compressed files onto the compressed bit stream for each layer and I-frame distance. Each such file is prefixed with a size header indicating the size of the compressed file (step 507) and are then concatenated to produce the bit-stream (step 509). This process is repeated for different layers and I-frame distances until the entire video is multiplexed onto the bit-stream.

Decoding the bit stream involves performing the above-described function in inverse order. More specifically, a demultiplexer reads the size header, extracts the size information, and then uses the size information to extract an appropriate number of bits from the remaining bit-stream to be passed onto the next modules. A lossless decoder receives each of the bit-stream data units that are passed to it by the demultiplexer and decodes the unit. A run length decoder receives outputs of the lossless decoder module corresponding to the quantized transform coefficients data, which were compressed using a combination of run-length-coding and YK algorithm. Finally, a quantized transform coefficients decoder reverses the bit-plane coding of the quantized transform coefficients data.

Hardware Overview

Figure 6:
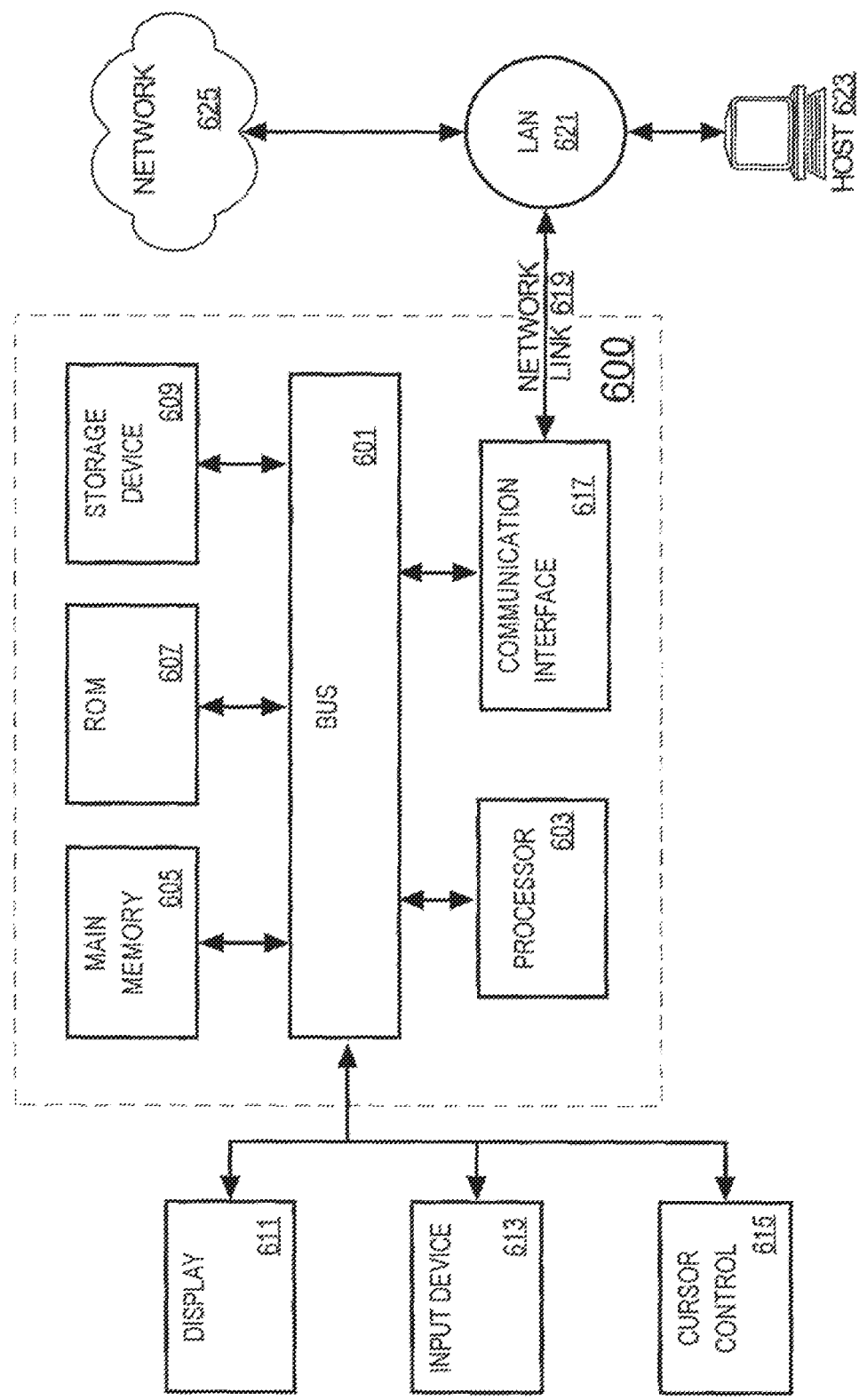
FIG. 6 depicts a computer system that can be used to implement an embodiment of the present invention.

FIG. 6 illustrates a computer system 600 upon which an embodiment according to the present invention can be implemented. The computer system 600 includes a bus 601 or other communication mechanism for communicating information, and a processor 603 coupled to the bus 601 for processing information. The computer system 600 also includes main memory 605, such as a random-access memory (RAM) or other dynamic storage device, coupled to the bus 601 for storing information and instructions to be executed by the processor 603. Main memory 605 can also be used for storing temporary variables or other intermediate information during execution of instructions to be executed by the processor 603. The computer system 600 further includes a read only memory (ROM) 607 or other static storage device coupled to the bus 601 for storing static information and instructions for the processor 603. A storage device 609, such as a magnetic disk or optical disk, is additionally coupled to the bus 601 for storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is cursor control 615, such as a mouse, a trackball, or cursor direction keys for communicating direction information and command selections to the processor 603 and for controlling cursor movement on the display 611.

According to one embodiment of the invention, video compression is provided by the computer system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the present invention. Thus, embodiments of the present invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated service digital network (ISDN) card, a cable modem, or a telephone modem to provide a data communication connection to a corresponding type of telephone line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by service provider. The local network 621 and network 625 both use electrical, electromagnetic, or optical signals to convey information and instructions. The signals through the various networks and the signals on network link 619 and through communication interface 617, which communicate digital data with computer system 600, are exemplary forms of carrier waves bearing the information and instructions.

The computer system 600 can send messages and receive data, including program code, through the network(s), network link 619, and communication interface 617. In the Internet example, a server (not shown) might transmit requested code belonging an application program for implementing an embodiment of the present invention through the network 625, local network 621 and communication interface 617. The processor 604 may execute the transmitted code while being received and/or store the code in storage device 69, or other non-volatile storage for later execution. In this manner, computer system 600 may obtain application code in the form of a carrier wave.

The term "computer-readable medium" as used herein refers to any medium that participates in providing instructions to the processor 604 for execution. Such a medium may take many forms, including but not limited to non-volatile media, volatile media, and transmission media. Non-volatile media include, for example, optical or magnetic disks, such as storage device 609. Volatile media include dynamic memory, such as main memory 605. Transmission media include coaxial cables, copper wire and fiber optics, including the wires that comprise bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

CONCLUSION

A system and method for compressing video is described, in which video frames that between consecutive I-frames are grouped into a video data set. The video data set is split into separate homogeneous files, and each of the homogeneous files are individually compressed, preferably using the YK algorithm or other grammar-based coding algorithm.

The combination of grouping related frames and then splitting the grouped frames into homogeneous files can significantly improve the compression efficiency over prior approaches. For example, on a 10-second clip (at 30 frames per second, 352.times.288 pixel CIF resolution) of a low-motion, still background sequence of a talking head (as would be seen in a newscast), one embodiment of the present invention has produced improvements in compression of 8.80% over MPEG4, 13.38% over MPEG2, and 11.20% over H.263+. Another example involves a clip of the same duration and resolution of person using sign language, resulting overall compression improvements of 6.25% over MPEG4, 7.96% over MPEG2, and 10.25% over H.263+. A third example with a clip that has much motion, high spatial detail, and a moving camera resulted in overall compression improvements of 8.34% over MPEG4, 14.47% over MPEG2, and 14.16% over H.263+.

While the present invention has been described in connection with several embodiments and implementations, the present invention is not so limited but covers various obvious modifications and equivalent arrangements, which fall within the purview of the appended claims.

What is claimed is:

1. A method, comprising:
splitting, by a processing system including a processor, a video data set into a plurality of files, wherein the splitting comprises storing horizontal components of the video data set and vertical components of the video data set in first separate files of the plurality of files, storing mode information of the video data set and motion components in second separate files of the plurality of files, storing B-frame components of the video data set and P-frame components of the video data set in third separate files of the plurality of files, and storing mode 3 B-frame components of the video data set and mode 0, 1, and 2 B-frame components of the video data set in fourth separate files of the plurality of files;
compressing, by the processing system, each of the plurality of files to create a plurality of compressed files, the compressed files having varying sizes with an upper bound; and
prefixing, by the processing system, each of the plurality of compressed files with a header indicating a file size of that compressed file and having a header size sufficient to represent the upper bound.

2. The method of claim 1, further comprising generating, by the processing system, an auxiliary file containing auxiliary information for interpreting the plurality of compressed files.

3. The method of claim 2, wherein the auxiliary information comprises a frame width, a frame height, the header size, quantization parameters, or a combination thereof.

4. The method of claim 1, wherein the first separate files comprise transformation coefficients, the second separate files comprise motion vectors, and the third separate files comprise enhancement data.

5. The method of claim 4, further comprising:
using, by the processing system, the transformation coefficients to create a reconstructed video frame of the video data set;
adding, by the processing system, the reconstructed video frame to a buffered frame;
generating, by the processing system and from the buffered frame and the motion vectors, a predicted frame; and
applying, by the processing system, the predicted frame against a next frame of the video data set.

6. The method of claim 1, wherein the compressing further comprises applying a grammar-based code.

7. The method of claim 6, wherein the applying further comprises employing a YK algorithm.

8. The method of claim 1, wherein the compressing further comprises bit plane encoding quantized transform coefficients obtained from the video data set.

9. The method of claim 8, wherein the compressing further comprises performing a run length encoding of bit planed encoded coefficients.

10. A device comprising:
a processing system including a processor; and
a memory that stores executable instructions that, when executed by the processing system, facilitate performance of operations, the operations comprising:
grouping video frames that are between consecutive I-frames into a video data set, the video data set not including an I-frame;
splitting the video data set into a plurality of files, wherein the splitting comprises storing horizontal components of the video data set and vertical components of the video data set in first separate files of the plurality of files, storing mode information of the video data set and motion components in second separate files of the plurality of files, storing B-frame components of the video data set and P-frame components of the video data set in third separate files of the plurality of files, and storing mode 3 B-frame components of the video data set and mode 0, 1, and 2 B-frame components of the video data set in fourth separate files of the plurality of files;
individually compressing each of the plurality of files to create a plurality of compressed files, the compressed files having varying sizes with an upper bound; and
prefixing each of the plurality of compressed files with a header indicating a file size of that compressed file and having a header size sufficient to represent the upper bound.

11. The device of claim 10, wherein the operations further comprise generating an auxiliary file containing auxiliary information for interpreting the plurality of compressed files, wherein the auxiliary information comprises a frame width, a frame height, the header size, quantization parameters, or a combination thereof.

12. The device of claim 10, wherein the operations further comprise:
using transformation coefficients to create a reconstructed video frame of the video data set;
adding the reconstructed video frame to a buffered frame;
generating, from the buffered frame and motion vectors, a predicted frame; and
applying the predicted frame against a next frame of the video data set.

13. The device of claim 10, wherein the compressing further comprises applying a grammar-based code.

14. The device of claim 10, wherein the compressing further comprises bit plane encoding quantized transform coefficients obtained from the video data set.

15. A non-transitory, machine-readable medium comprising executable instructions that, when executed by a processing system including a processor, facilitate performance of operations, the operations comprising:
grouping video frames that are between consecutive I-frames into a video data set, the video data set not including an I-frame;
splitting the video data set into a plurality of files, wherein the splitting comprises storing horizontal components of the video data set and vertical components of the video data set in first separate files, storing mode information of the video data set and motion components in second separate files, storing B-frame components of the video data set and P-frame components of the video data set in third separate files, and storing mode 3 B-frame components of the video data set and mode 0, 1, and 2 B-frame components of the video data set in fourth separate files;
individually compressing each of the plurality of files to create a plurality of compressed files, the compressed files having varying sizes with an upper bound; and
concatenating each compressed file of the plurality of compressed files to produce a bit stream, wherein each compressed file of the plurality of compressed files is prefixed with a header indicating a file size of the compressed file and having a header size sufficient to represent the upper bound.

16. The non-transitory, machine-readable medium of claim 15, wherein the operations further comprise:
generating, by the processing system, an auxiliary file containing auxiliary information for interpreting the compressed files in the bit stream.

17. The non-transitory, machine-readable medium of claim 16, wherein the auxiliary information comprises a frame width, a frame height, the header size, quantization parameters, or a combination thereof.

18. The non-transitory, machine-readable medium of claim 15, wherein the operations further comprise:
using transformation coefficients to create a reconstructed video frame of the video data set;
adding the reconstructed video frame to a buffered frame;
generating, from the buffered frame and motion vectors, a predicted frame; and
applying the predicted frame against a next frame of the video data set.

19. The non-transitory, machine-readable medium of claim 15, wherein the compressing further comprises applying a grammar-based code.

20. The non-transitory, machine-readable medium of claim 15, storing enhancement data in fifth separate files, and wherein the operations further comprise:
generating an auxiliary file containing auxiliary information for interpreting the plurality of compressed files in the bit stream.

* * * * *